May 31, 1966     D. E. BECKETT     3,253,617
SPOOL VALVE CONSTRUCTION
Filed Oct. 9, 1962     3 Sheets-Sheet 2

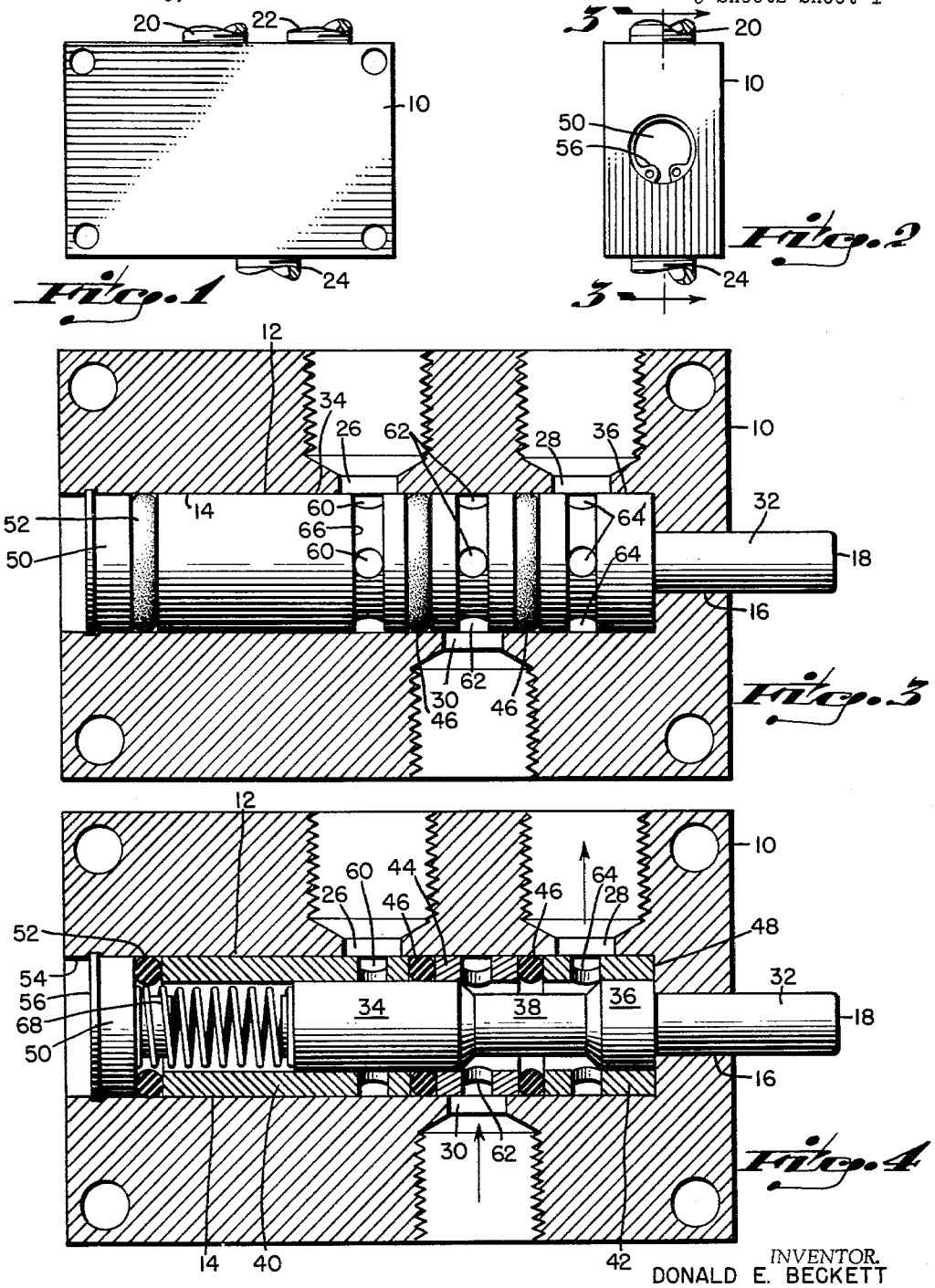

INVENTOR.
DONALD E. BECKETT

BY
*J. Warren Kinney Jr.*
ATTORNEY

United States Patent Office 3,253,617
Patented May 31, 1966

3,253,617
SPOOL VALVE CONSTRUCTION
Donald E. Beckett, Wilmington, Ohio, assignor to Beckett-Harcum Co., Wilmington, Ohio, a corporation of Ohio
Filed Oct. 9, 1962, Ser. No. 229,402
6 Claims. (Cl. 137—625.69)

The present invention relates to a spool valve construction, and is directed particularly to improvements concerning the spool receptive element of the valve. Valves of the character herein disclosed comprise generally a body formed with a series of ports, and a longitudinal bore in which may be shifted an elongate movable valve element or spool designed to place various ports in registry to direct a fluid selectively through certain ports incident to longitudinal shifting of the valve spool.

An object of the invention is to provide an improved valve spool construction making possible great economies in manufacture and asembly of a valve.

Another object is to improve the performance and durability of the completed valve spool receptive element when incorporated in a valve body.

Another object is to make possible the elimination of certain expensive finishing operations in the manufacture of spool valves, notably the time-consuming honing operation heretofore employed in the effort to prevent leakage of fluid throughout the valve.

A further object of the invention is to enhance the ability of the valve to operate for greatly extended periods of time without leakage troubles, and without the need for frequent servicing.

The foregoing and other objects are attained by the means described herein and ilustrated upon the accompanying drawings, in which:

FIG. 1 is a side elevational view of a spool valve embodying the present invention.

FIG. 2 is an end elevation of the same.

FIG. 3 is an enlarged cross-section taken on line 3—3 of FIG. 2, the spool being shown in elevation.

FIG. 4 is a view similar to FIG. 3, the valve spool being shown in cross-section.

Figure 5:
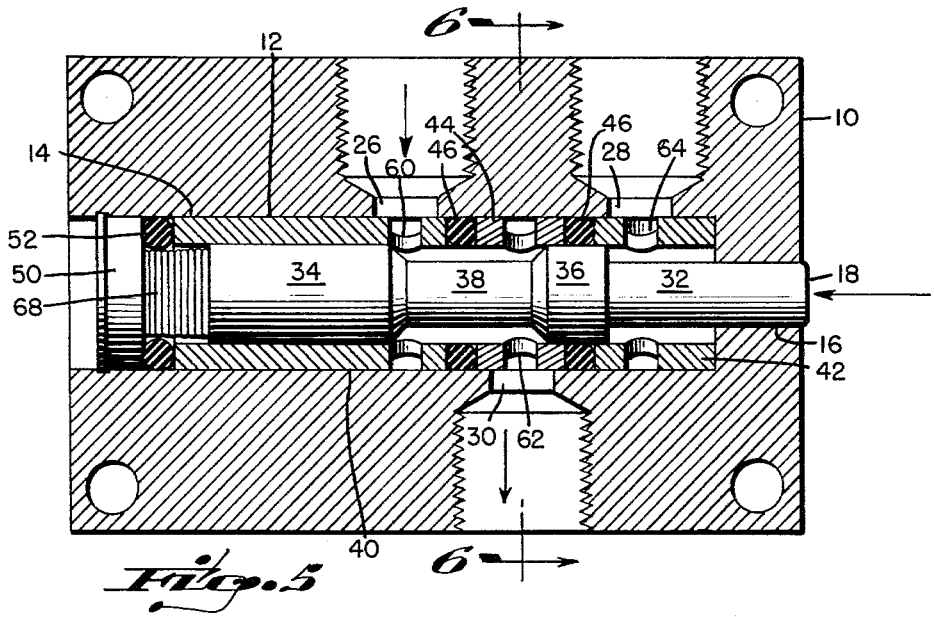
FIG. 5 is a view similar to FIG. 4, with the spool shifted to the left.
Figure 6:
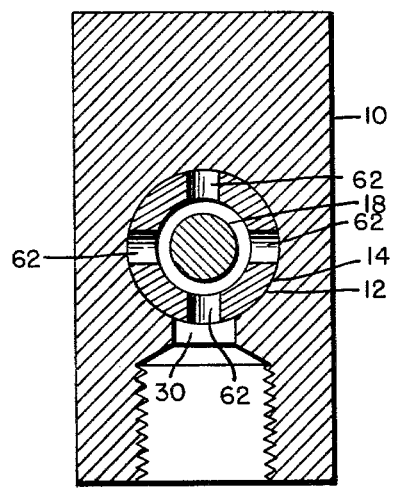
FIG. 6 is a cross-sectional view taken on line 6—6 of FIG. 5.

In the production of spool valves, common practice has been to drill and ream the valve body for reception of the valve spool, and thereafter hone or lap the spool to the bore with great precision in order to attain a fluid-tight fit, while at the same time providing for easy slidability of the spool lengthwise within the bore. This procedure has been regarded as a major operation in manufacture of the valve, from the standpoint of time and labor expense, and for that reason it is desirable to eliminate the procedure or reduce it to reasonable proportions.

A further objection to the prevailing procedure involved undue wear of the constituent parts working in metal-to-metal contact, and resulting in premature leakage problems difficult if not impossible to overcome without replacing the valve in its entirety. The expense of repair in such cases was usually regarded as unfeasible, and unsatisfactory.

In accordance with the present invention, the expense of fitting the valve spool to the body bore is greatly facilitated and expedited, with resultant substantial savings of time and labor. In addition, the performance and durability of the valve are greatly improved and enhanced, so that maintenance expense is reduced to a practical minimum, with the further advantage that on-job reconditioning of the valve is made possible at little expense.

Referring to the drawings, 10 indicates a valve body of metal or other suitable material, bored for slidable reception of a valve spool indicated generally by the character 12. The bore in which the spool may reciprocate is indicated at 14, and is preferably machined with ordinary care to provide a smooth inner wall. The bore may be reduced at one end 16, to nicely accommodate an exposed end portion 18 of the valve spool, whereby the spool may be actuated by longitudinal shifting within bore 14.

At 20, 22 and 24 are indicated a series of pipes or tubes having fluid connection with ports 26, 28 and 30 of the valve body. For the purposes of the example illustrated, ports 26, 28 and 30 may be considered, respectively, fluid inlet, exhaust, and service ports, the latter being adapted to convey fluid to and from a device such as a pneumatic cylinder adapted for controlled reciprocation according to movements of the valve spool relative to the valve body. FIG. 4 shows the spool shifted to the right for exhausting fluid from the service port 30, wherein FIG. 5 shows it shifted to the left for supplying fluid under pressure to the service port by way of inlet 26.

With particular reference to the form of valve illustrated by FIGS. 1 to 6, inclusive, it is noted that the valve spool comprises a stem 32 on which are formed spaced lands 34 and 36, which flank a reduced or recessed portion 38. Recess 38 is of such length as to span two ports, for example 28 and 30, and thereby place the ports in fluid communication with one another (FIG. 4). In like manner, the recess of the stem may be caused to span and connect the ports 26 and 30 (FIG. 5), by shifting the spool to the left. In this manner, the service port 30 may be either charged with fluid under pressure, or exhausted, depending upon the position of the spool stem.

It should be noted that stem 32, formed of a single turned piece of metal, has no direct contract with the principal part of the body bore. Instead, there is assembled upon the stem, prior to insertion thereof into the body bore, a series of cylindrical sleeves and seal rings which cooperate with the stem to make up the composite valve spool.

As shown in FIGS. 3 and 4, the stem is encircled by sleeves referred to as spool sections, one of which 40, is an end section encircling the stem land 34, while an opposite spool section 42 encircles land 36. Intermediate the end sections 40 and 42 is an intermediate spool section 44 spaced from the end sections by means of O-rings 46 or similar resilient seal rings, which bear against the ends of the several spool sections and upon the stem lands and the inner wall of bore 14, to effect fluid-tight seals at all these locations. The stem 32 is adapted to slide longitudinaly through the spool sections and their seal rings, from the FIG. 4 position to that of FIG. 5.

The several spool sections 40, 42 and 44, may be formed of a metal or any other material suitable for the purposes of the valve, and together with the seal rings 46, have a snug but not tight fit within the body bore. End section 42 seats upon the end shoulder 48 of bore 14, and is pressed against it by a plug or cap 50 that applies endwise force to all the spool sections and the interposed seal rings, including a seal ring 52 placed between the plug and the end spool section 40 to prevent leakage of fluid along the outer face of section 40. The plug may be removably anchored within bore 14 near the open end 54 thereof, by means of a spring steel expander ring 56 or equivalent retainer capable of being dislodged for removal and disassembly of the composite spool.

Each spool section 40, 42, and 44 is provided with one or more radial spool ports, those being indicated at 60, 62, and 64, and arranged in registry with the body ports 26, 28, and 30. The radial spool ports of any one spool section are preferably connected together by means of a groove 66 formed in the outer face of the section. The groove ensures constant registry of a spool port with a corresponding body port irrespective of any rotated positions of the sections occurring during assembly and placement of the valve spool within bore 14.

In one form of valve, as illustrated, it may be desirable to have the spool stem yieldingly biased in one longitudinal direction, as by means of a compression spring 68, so that the stem upon being shifted lengthwise in one direction, will be urged to return to an initial position of extension from the valve body. As herein suggested, spring 68 may be encased by the hollow spool section 40, with its opposite ends abutting the spool stem and the inside of cap or plug 50, for constantly urging the stem to the right. If for any reason the spool stem is not be spring loaded, the spring 68 may be omitted, whereupon the stem will remain in any given shifted position relative to the valve bore.

FIGS. 4 and 5 illustrate the two normal shifted positions of the valve stem, whereby the service port 30 may be exhausted of fluid through exhaust port 28, or supplied with fluid under pressure by way of inlet port 26, depending upon the shifted position of the valve stem.

As will be understood from the foregoing explanation, the valve spool is a composite structure assembled from simple and inexpensive elements, and adapted for easy application or removal within the body bore of the valve. Undesirable leakage of fluid amongst the ports and about or within the spool assembly is virtually eliminated, this being accomplished without resort to expensive time-consuming machining and finishing of the valve parts. In the case of eventual wear due to hard or prolonged usage, it is a simple matter to remove plug 50 and withdraw the spool parts from the body bore, in readiness for a prompt and effortless replacement of an assembled new spool or of new constituents to replace those which may be worn or damaged.

Figure 7:
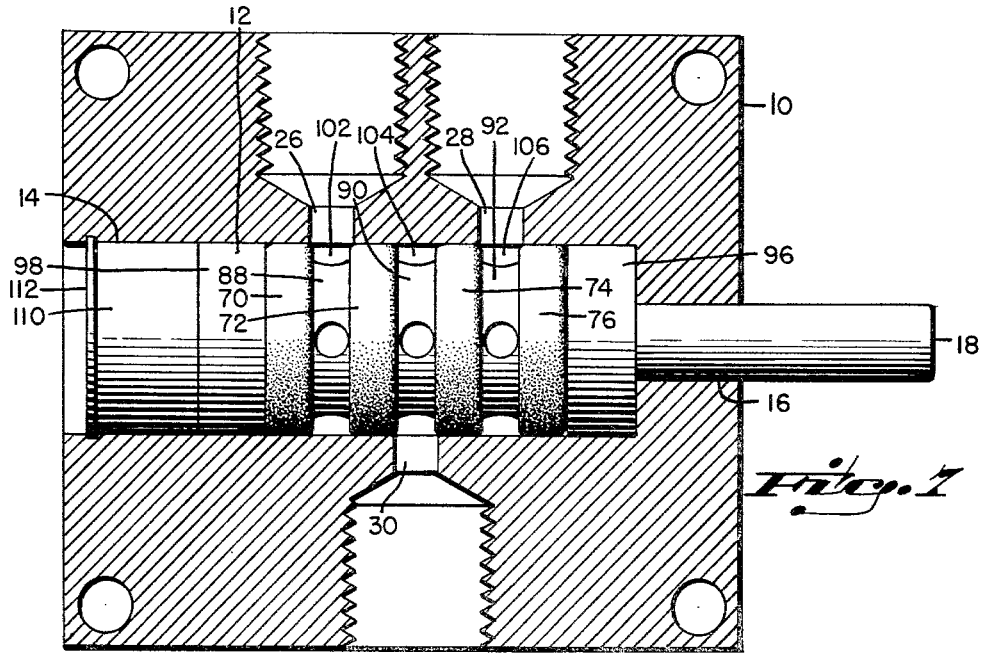
FIG. 7 is a cross-sectional view of a modified form of the valve shown in FIG. 3.
Figure 8:
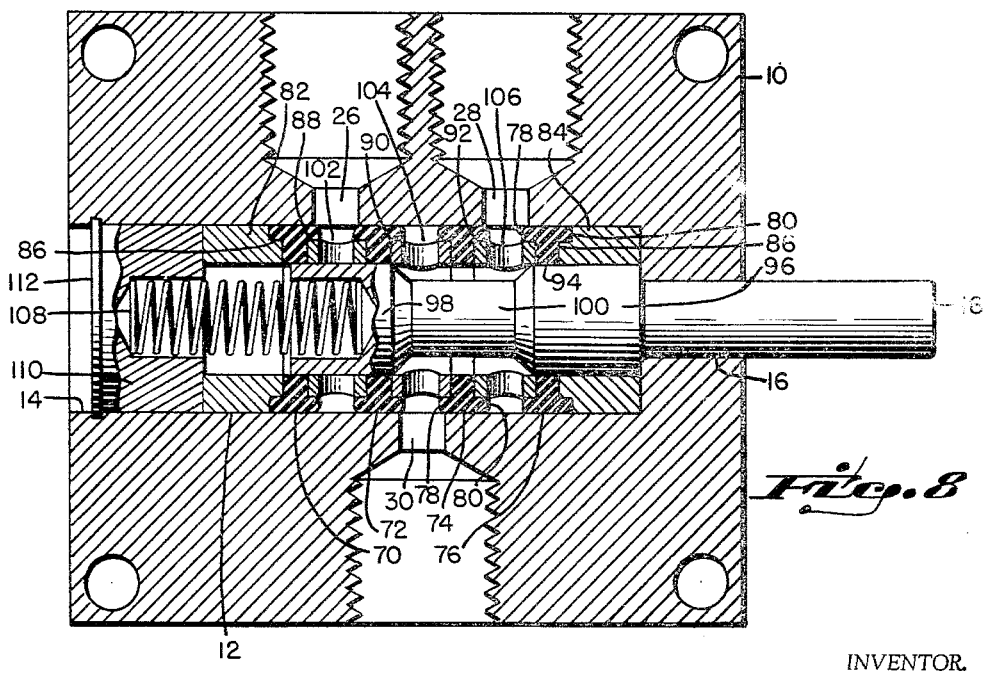
FIG. 8 is a view similar to FIG. 7, the spool being shown in cross-section.

Referring now to the modified structure of FIGS. 7 and 8, the basic construction is seen to be quite similar, and to possess the same advantage as the structure previously disclosed. In the modified structure, the seal rings 70, 72, 74 and 76 are T-shaped in cross-section, rather than O-shaped, and the oppositely directed outer flanges 78 and 80, constituting the head of each seal ring, overlap the several spool sections.

As FIG. 8 indicates, the end spool sections 82 and 84 are in diameter slightly less than the diameter of the body bore 14, but each of said sections is machined to provide an annular shoulder 86 against which the resilient rings 70 and 76 may seal. The intermediate spool sections 88, 90, and 92 are reduced in diameter so as to be embraced by the T-shaped flanges of the intermediate seal rings, for effecting fluid-tight seals therebetween. The base or inner portions 94 of all the seal rings are adapted to form fluid-tight sealed joints against the lands 96 and 98 of the spool stem. Between the lands 96 and 98, the stem is reduced in diameter to form the recess 100 constituting a chamber through which the body ports 28, 30, and 30, 26, may be placed in intercommunicating relationship by stifting of the spool stem 18.

As in the structure previously described, each intermediate spool section is radially apertured to provide one or more spool ports 102, 104, 106, which ports are in constant registry with the body ports 26, 30, and 28, respectively.

In the illustration of FIG. 8, the recess 100 of the stem provides for flow of fluid from service port 30 to exhaust port 28, thereby to relieve fluid pressure from any pneumatic or hydraulic device connected with the service port. If such device is to be charged with fluid under pressure, one need only shift the spool stem to the left, causing recess 100 to place the fluid pressure or inlet port 26 in fluid communication with service port 30. The stem may be returned to the initial position of FIG. 8 by means of spring 108, substantially as previously explained. The spring may be omitted, if desired, to leave the stem unbiased.

At 110 is indicated a plug or cap fitted into bore 14 and held therein by a removable spring retainer 112, for maintaining the composite spool in position within the bore. The plug or cap applies force constantly to the seal rings and spool sections in the direction of the stem axis, for effecting fluid-tight sealed connections between the sections and against the stem lands and the body bore. The seals are particularly effective at the spool shoulders 86 and about the perimeters of the intermediate spool sections where the oppositely directed outer flanges 78 and 80 of the seal rings overlie the perimeters of the several spool sections.

The several spool sections, including the end sections 96 and 98, preferably are rather tightly embraced by the oppositely directed outer flanges 78 and 80 of the seal rings in assembly of the composite spool, so that the constituents of the spool will be thereby held together as a unit during handling and insertion of the spool into the valve body bore incident to final assembly of the valve, or incident to replacement thereof.

The valve of FIGS. 7 and 8 may perform the same type of service as does the valve of FIGS. 1 to 6, previously explained, and will have the appearance of FIGS. 1 and 2. With the exception of the resilient O-rings and T-rings, the valve parts may be constructed of brass, stainless steel or other metals or materials suited to the nature of the fluid controlled by the valve.

It is to be understood that various modifications and changes in materials and structural details of the device may be resorted to, within the scope of the appended claims, without departing from the spirit of the invention.

What is claimed is:

1. A valve spool comprising in combination, an elongate stem having opposite ends and a pair of spaced lands intermediate said ends, the stem being reduced in size intermediate the lands to provide a fluid-receptive recess, a series of axially bored and radially apertured spool sections surrounding the stem for longitudinal sliding movement of the stem therein, certain of said spool sections being end sections and others being intermediate sections flanked by the end sections, and all of said spool sections having peripheral faces, and opposite end faces substantially normal to the stem axis, a plurality of individual resilient seal rings each surrounding and contacting the stem, and interposed as spacers between the end faces of successive spool sections, said rings being T-shaped in cross-section with the stems thereof between said end faces of spool sections and the heads of the T providing oppositely extended flanges each continuous about the periphery of the ring and providing surfaces extending radially outwardly beyond said intermediate spool sections and also providing axially extending surfaces, and shoulders on the end spool sections and on the intermediate spool sections, said shoulders contacting and providing radial support for the flanges of the seal ring, and said flanges being spaced from each other to provide unobstructed flow through said apertures.

2. The combination as set forth in Claim 1, wherein one of the spool end sections is hollow and extends beyond one end of the stem, a cap concentric with said hollow end section and compression spring means within the hollow end section and having opposite ends to abut the cap and said one end of the stem.

3. A valve spool comprising in combination, an elongate stem having opposite ends and a pair of spaced lands intermediate said ends, the stem being reduced in size intermediate the lands to provide a fluid-receptive recess, a series of axially bored and radially apertured spool sections surrounding the stem for longitudinal sliding movement of the stem therein, certain of said spool sections being end sections and others being intermediate sections flanked by the end sections, and all of the spool sections having peripheral faces, and opposite end faces substantially normal to the stem axis, a plurality of individual resilient seal rings each surrounding and contacting the stem, and interposed as spacers between spaced end faces of successive spool sections, said rings being T-shaped in cross-section with the heads of the T providing oppositely extended flanges each continuous about the periphery of the ring and axially continuous between opposite ends thereof, and shoulders on the end spool sections and on the intermediate spool sections, to provide radial support for the flanges of the seal rings, said flanges providing surfaces extending radially outwardly beyond said intermediate spool sections, the ring flanges being snugly fitted upon said shoulders to releasably connect the spool sections one to another axially of the stem, and said flanges being spaced from each other to provide unobstructed flow through said apertures.

4. A valve spool comprising in combination, an elongate stem having opposite ends and a pair of spaced lands intermediate said ends, the stem being reduced in size intermediate the lands to provide a fluid-receptive recess, a series of axially bored and radially apertured spool sections surrounding the stem for longitudinal sliding movement of the stem therein, certain of said spool sections being end sections and others being intermediate sections flanked by the end sections, all of said spool sections having peripheral radial surfaces and having opposite end faces, said opposite end faces being substantially normal to the stem axis, a plurality of individual resilient seal rings each surrounding and contacting the stem, each of said end sections having the inner end thereof externally reduced forming a radially outwardly facing annular shoulder, said peripheral radial surfaces of said intermediate spool sections having maximum outside diameters approximating the diameters of said shoulders of the end sections, said seal rings being T-shaped in cross section with the stems thereof interposed between the spaced end faces of successive spool sections with the heads of the T providing opposite axially extending flanges each continuous about the periphery of the ring and providing axially extending and radially outwardly directed surfaces spanning the spaces between said spaced end faces of the spool sections, the seal ring flanges adjacent to the said end sections engaging over and encircling the adjacent annular shoulders and the seal ring flanges adjacent to the intermediate sections projecting over and encircling the said radial surfaces of the intermediate sections, the said shoulders of the end sections and the radial surfaces of the intermediate sections providing radial suport for the flanges of the seal rings.

5. A valve comprising in combination, a body including an elongate bore having opposite ends, one of said ends having a reduced diameter portion forming an inside shoulder, said reduced portion opening through a side of the body, the bore opening at its other end through the opposite side of the body, the body having a series of ports in fluid communication with the larger diameter portion of the bore, a valve spool comprising a stem having a pair of spaced lands, the stem being reduced in size intermediate the lands to provide a recess communicable with the body ports selectively incident to axial shifting of the stem within the bore, the stem further being reduced at one end land forming a terminal axial extension whereby said end land terminates in a stop shoulder opposing said inside stop shoulder to limit movement of the stem in one direction, said axial extension of the stem extending into said reduced diameter portion of the bore, a series of axially bored and radially apertured spool sections surrounding the stem for longitudinal sliding movement of the stem therein, certain of said spool sections being end sections and the others being intermediate sections flanked by the end sections, all of the spool sections having peripheral faces and opposite end faces, a plurality of individual resilient seal rings each surrounding and contacting the stem and interposed as spacers between spaced end faces of successive spool sections, said rings being T-shaped in cross section with the stems thereof between said spaced end faces of spool sections and the head of the T providing oppositely extending flanges each continuous about the periphery of the ring and providing axially extending and radially outwardly directed surfaces and shoulders on the end spool sections and on the intermediate spool sections upon which said flanges rest the diameter of said shoulders being the largest diameter of said intermediate section, and said radially outwardly directed surfaces having sealing engagement with the surrounding surface of the bore.

6. The invention according to claim 5 wherein the end spool section remote from said terminal axial extension of the valve spool stem extends beyond the adjacent end of the stem and forms a hollow shank, a closure member for the said other end of the bore, and compression spring means in said hollow shank and having opposite ends abutting said closure member and said adjacent end of the stem and resiliently urging the stop shoulder of said stem against said inside stop shoulder.

References Cited by the Examiner

UNITED STATES PATENTS

| Re. 25,251 | 10/1962 | Quail. | |
|---|---|---|---|
| 2,349,170 | 5/1944 | Jackman. | |
| 2,617,257 | 11/1952 | Douglas | 137—625.69 X |
| 2,661,762 | 12/1953 | Bryant | 137—625.48 X |
| 2,713,989 | 7/1955 | Bryant | 137—625.48 X |
| 2,742,922 | 4/1956 | Frellsen | 137—625.69 |
| 2,920,650 | 1/1960 | Moog | 137—625.48 X |
| 2,934,086 | 4/1960 | Blatt | 137—625.25 X |

FOREIGN PATENTS

| 616,199 | 3/1961 | Canada. |
|---|---|---|
| 1,141,238 | 3/1957 | France. |

M. CARY NELSON, *Primary Examiner.*

A. J. JAFFE, *Assistant Examiner.*